April 19, 1932.  N. D. LEVIN.  1,854,593
EQUALIZING MECHANISM
Filed May 29, 1930
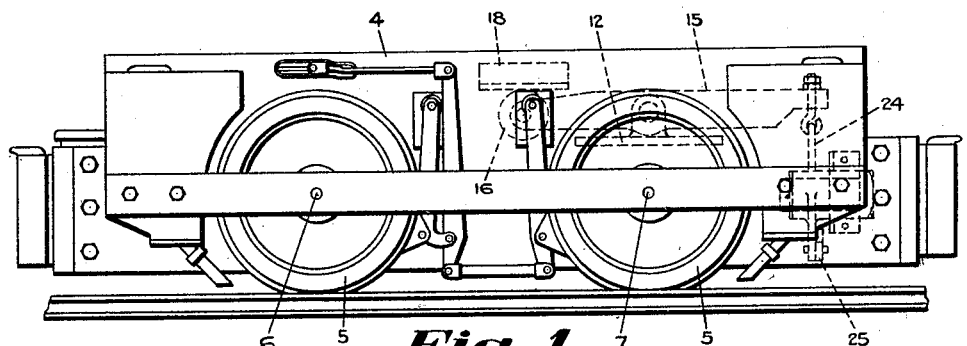
Fig. 1
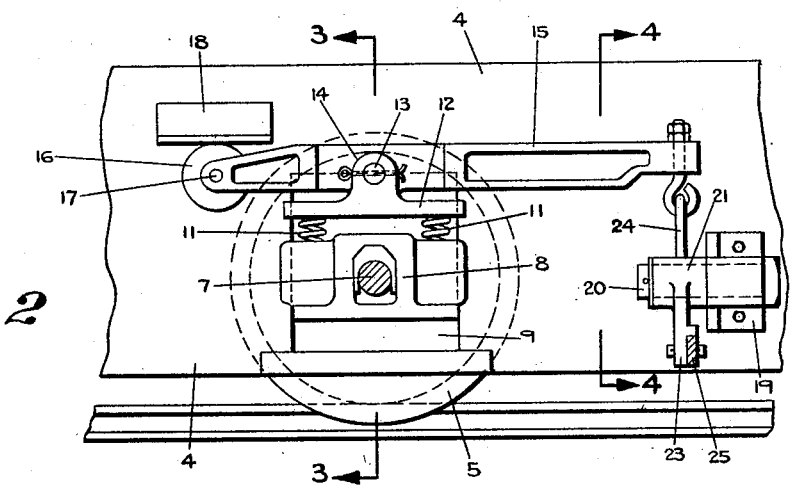
Fig. 2
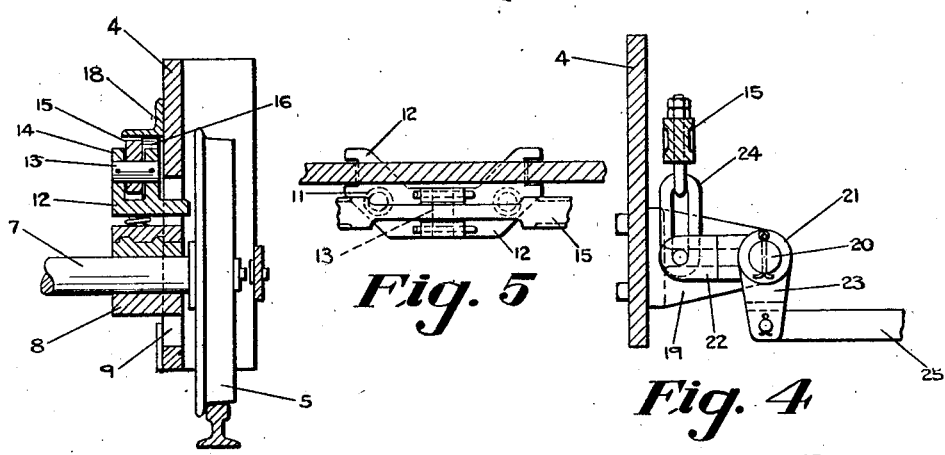
Fig. 3
Fig. 5
Fig. 4
Inventor
Nils D. Levin
By Cushman, Bryant & Darby
attys.

Patented Apr. 19, 1932

1,854,593

UNITED STATES PATENT OFFICE

NILS D. LEVIN, OF COLUMBUS, OHIO, ASSIGNOR TO THE JEFFREY MANUFACTURING COMPANY, OF COLUMBUS, OHIO, A CORPORATION OF OHIO

EQUALIZING MECHANISM

Application filed May 29, 1930. Serial No. 457,381.

The present invention relates to equalizing mechanisms, and is designed to provide an efficient means on opposite sides of the mechanism to which it is applied, for securing substantially uniform load distribution on the load supports. It is here shown as applied to loads supported on wheeled axles, so that, in travelling over uneven trackways, the movements of the load relative to the axle ends will be equalized, and the load uniformly distributed.

In the present disclosure the improvement is shown applied to a locomotive of the mining type, but it will be understood that this is illustrative, and that the equalizing mechanism may be applied wherever it is desirable to maintain uniform distribution of the load by equalizing load movement relative to the changing positions of the axle ends.

In the drawings herewith, and forming part of this disclosure:—

Figure 1 is a view in side elevation of a mining locomotive of a usual type,

Figure 2 is an enlarged view showing the equalizing mechanism applied and its relation to the load and to an axle, Figure 3 is a view substantially on the line 3—3 of Figure 2 looking in the direction of the arrows, Figure 4 is a view substantially on the line 4—4 of Figure 2, looking in the direction of the arrows, and Figure 5 is a detailed plan view of an abutment member constituting an element of the mechanism.

Referring to the drawings by numbers, like numbers indicating like parts in the several views, 4 indicates the side frame of the locomotive or other vehicle, it being understood that the frame may be of any suitable makeup or construction, dependent on the use to which the vehicle is to be put.

The vehicle is supported, as is customary, upon four wheels, here shown as flanged car wheels designed to run over tracks, these wheels being connected in the usual manner by axles 6 and 7. As here shown, the axle 6 will be mounted in any suitable or usual type of axle supports or boxes, while axle 7, as here shown, will be provided with the equalizing mechanism.

The axle 7, as best shown in Figures 2 and 3, is mounted in the axle support or box 8 of not unusual type, disposed in a guideway 9 in the side frame 4 of the vehicle, so that they may be relative movement between the vehicle body, the axle box 8 and axle 7 as the vehicle travels over the track.

There will be a similar arrangement of sliding or relatively movable axle boxes on each side of the axle 7, it being understood that the equalizing mechanism is duplicated on each side of the vehicle.

The axle box 8 supports resilient members or springs 11, upon which rests a movable abutment 12 mounted in the guideway 9 so as to move therein. The abutment 12 has engaged therewith, by means of a pivot connection 13 mounted in the supports 14 on abutment 12, a floating lever 15 which moves with the abutment 12, and the ends of which are free to swing or tilt as the lever 15 rocks on its pivot 13. At one end of the lever 15 is provided an anti-friction member, as here shown a roller 16, mounted on the pin 17, which roller engages a fulcrum stop 18, here shown as secured to the side frame 4, and limits movement of the roller 16 and the floating lever 15 in one direction, although permitting free longitudinal movement in other directions.

It will be seen that with this arrangement, and with the parts assembled in working position, the lever 15 is a lever of the third order, with its fulcrum at the stop 18, its power at the pivotal point 13 of the lever, and its load at the opposite end, where it is coupled with the transfer mechanism, which will now be described.

Secured to the side frame is a supporting bracket 19, having mounted therein a journal stud 20, upon which is secured for rocking movement a bell crank lever made up of the box member 21 and the arms 22 and 23. The arm 22 is coupled by the loose link 24 to the equalizing lever 15 in any suitable manner, as here shown by means of an eye bolt. The arm 23 is coupled by a pull-and-push member 25 with equalizing mechanism on the other side of the vehicle, and which, as stated, is preferably similar in make-up to that herein described.

With the mechanism described, the operation as the vehicle moves over the trackway will be as follows: Upon elevation or depression of one end of the axle, due to inequalities in the track, there will be relative movements of axle and side frame, owing to the spring supports 11, which will be imparted to the abutment 12 and lever 15. The stop 18, of course, will resist the movement of the roller 16, although permitting it to shift lengthwise as the lever 15 rocks upon its pivot 13. Upward movement of the lever 15 will, through the link connection 24, rock the bell crank lever, and, through the arms 22 and 23, exert a pull on the thrust rod 25, so as to cause the lever 15, or equivalent mechanism, at the opposite side, to make an opposite equalizing movement. Downward movement of the end of the lever 15 will, of course, ease off the linkage connection between it and the bell crank lever and allow the equalizing mechanism on the opposite side to move in the reverse direction.

The mechanism which I have developed is simple and rugged in character. By providing the floating arrangement of equalizing lever shown and described, the mechanism, while effective, is not likely to derangement or breakage through sudden jolts or shocks, such as are not infrequently encountered where the load is heavy and the track is uneven. Furthermore, by reason of the leverage and the direct transfer connections provided, the equalizing effect is quickly and fully transmitted between the opposite sides of the load.

Such changes as are mechanical and do not depart from the principle here involved may be made and still be within the range of my invention.

I claim:

1. Equalizing mechanism comprising, in combination, a load supporting frame, axle supports on opposite sides of and movable relative to said frame, a floating equalizing lever responsive to relative movements of said frame and said supports, a fulcrum for one end of said lever, and transmitting means connecting the other end of said lever with equalizing means on the opposite side of said frame to effect compensating movements and give substantially uniform load distribution.

2. Equalizing mechanism comprising, in combination, a load supporting frame, axle supports on opposite sides of and movable relative to said frame, a floating equalizing lever responsive to relative movements of said frame and said supports having a free fulcrum end, a fulcrum engaged by the free end of said lever, and transmitting means connecting the other end of said lever with equalizing means on the opposite side of said frame to effect compensating movements and give substantially uniform load distribution.

3. Equalizing mechanism comprising, in combination, a load supporting frame, axle supports on opposite sides of and movable relative to said frame, a floating equalizing lever responsive to relative movements of said frame and supports and having a free fulcrum end, anti-friction means on the free end of said lever, a fulcrum for the free end of said lever, and transmitting means connecting the other end of said lever with equalizing means on the opposite side of said frame to effect compensating movements and give substantially uniform load distribution.

4. Equalizing mechanism comprising, in combination, a load supporting frame, axle supports on opposite sides of and movable relative to said frame, a pivotally mounted floating equalizing lever responsive to relative movements of said frame and supports, a fulcrum for one end of said lever, and transmitting means connecting the other end of said lever with equalizing means on the opposite side of said frame to effect compensating movements and give substantially uniform load distribution.

5. Equalizing mechanism comprising, in combination, a load supporting frame, axle supports on opposite sides of and movable relative to said frame, a support responsive to relative movements of said frame and supports, a floating equalizing lever carried by said lever support, a fulcrum for one end of said lever, and transmitting means connecting the other end of said lever with equalizing means on the opposite side of said frame to effect compensating movements and give substantially uniform load distribution.

6. Equalizing mechanism comprising, in combination, a load supporting frame, axle supports on opposite sides of and movable relative to said frame, a lever support resiliently mounted on and responsive to relative movements of said frame and supports, a floating equalizing lever carried by said lever support, a fulcrum for one end of said lever, and transmitting means connecting the other end of said lever with equalizing means on the opposite side of said frame to effect compensating movements and give substantially uniform load distribution.

7. Equalizing mechanism comprising, in combination, a load supporting frame, axle supports on opposite sides of and movable relative to said frame, a lever support resiliently mounted on and responsive to relative movements of said frame and supports, a floating equalizing lever pivoted on said lever support, a fulcrum for one end of said lever, and transmitting means connecting the other end of said lever with equalizing means on the opposite side of said frame to effect compensating movements and give substantially uniform load distribution.

8. Equalizing mechanism comprising, in combination, a load supporting frame, axle supports on opposite sides of and movable relative to said frame, a floating equalizing lever responsive to relative movements of said frame and supports and having a free fulcrum end, a stop on said frame engaged by the free end of said lever and forming a fulcrum therefor, transversely disposed transmitting means, connections between one end of said transmitting means and the other end of said equalizing lever, and means on the opposite side of said frame connected with said transmitting means to effect compensating movements and give substantially uniform load distribution.

9. Equalizing mechanism comprising, in combination, a load supporting frame, axle supports on opposite sides of and movable relative to said frame, a floating equalizing lever pivotally mounted and responsive to relative movements of said frame and supports, a stop on said frame to engage a free end of said lever and form a fulcrum therefor, a transmitting rod disposed transversely of said frame, rod operating means mounted on said frame, connections between the other end of said equalizing lever and said rod operating means, and means on the opposite side of said frame connected with said rod to effect compensating movements and give substantially uniform load distribution.

10. Equalizing mechanism comprising, in combination, a load supporting frame, axle supports on opposite sides of and movable relative to said frame, a pivotally mounted equalizing lever responsive to relative movements of said frame and supports, a stop on said frame to form a fulcrum for a free end of said lever, a transmitting rod disposed transversely of said frame, a bell crank lever pivotally mounted on said frame and connected with said rod, a connection between said bell crank lever and the other end of said equalizing lever, and means connecting the other end of said rod with equalizing means on the opposite side of said frame to effect compensating movements and give substantially uniform load distribution.

11. Equalizing mechanism comprising, in combination, a load supporting frame, axle supports on opposite sides of and movable relative to said frame, a pivotally mounted equalizing lever responsive to relative movements of said frame and supports, a stop on said frame to form a fulcrum for a free end of said lever, a transmitting rod disposed transversely of said frame, a bell crank pivotally mounted on said frame and connected with said rod, a connection between said bell crank lever and the other end of said equalizing lever to effect movement of said bell crank lever in one direction only, and means connecting the other end of said rod with equalizing means on the opposite side of said frame to effect compensating movements and give substantially uniform load distribution.

12. Equalizing mechanism comprising, in combination, a load supporting frame, axle supports on opposite sides of and movable relative to said frame, a pivotally mounted equalizing lever responsive to relative movements of said frame and supports, a stop on said frame to form a fulcrum for a free end of said lever, a transmitting rod disposed transversely of said frame, a bell crank pivotally mounted on said frame and connected with said rod, a loose link connection between said bell crank lever and the other end of said equalizing lever to impart movements of said equalizing lever to said bell crank lever in one direction only, and means connecting the other end of said rod with equalizing means on the opposite side of said frame to effect compensating movement and give substantially uniform load distribution.

13. In equalizing mechanism of the class described, a lever carrying plate provided with ends adapted to engage a guideway, a pivot mounting on said plate, and an equalizing lever one end of which engages a fixed culcrum, and the other end of which is connected with a push and pull transfer mechanism carried in said pivot mounting.

14. In equalizing mechanism of the class described, a carrier plate having ends adapted to engage and be guided in a guideway, bearing lugs on said carrier plate, and an equalizing lever one end of which engages movably a fixed fulcrum and the other end of which is connected with a push and pull transfer mechanism pivoted in said bearing lugs.

15. In equalizing mechanism of the class described, a carrier plate having ends adapted to engage and be guided in a guideway, bearing lugs on said carrier plate offset laterally from the guide engaging ends and the guideway, and a floating equalizing lever pivoted in said bearing lugs.

16. In equalizing mechanism of the class described, a carrier plate adapted to be mounted and move in a guideway, a floating equalizing lever one end of which engages movably a fixed fulcrum and the other end of which is connected with a push and pull transfer mechanism movably mounted on said carrier plate, and anti-friction means on the fulcrum end of said equalizing lever.

17. In equalizing mechanism of the class described, a carrier plate movable in a guideway on the frame of a car, an equalizing lever movably mounted on said carrier plate, a fulcrum with which one end of said lever is engaged, and a push and pull transfer mechanism disposed transversely of the car with which the other end of said lever is engaged.

18. In equalizing mechanism of the class described, a carrier plate mounted and movable in a guideway on the frame of the car, an equalizing lever movably mounted on said carrier plate and having an anti-friction roller at one end, and a fixed fulcrum engaged by the roller on said equalizing lever and transversely disposed push and pull mechanism with which the other end of said lever is connected.

19. In equalizing mechanism of the class described, a carrier plate having a guideway engaging portion to engage a guideway on the frame of the car, spring supporting means for said carrier plate offset laterally from the guideway engaging portion, an equalizing lever pivotally mounted on said carrier plate provided with an anti-friction roller at one end, a fixed fulcrum engaged by the roller on said lever, and a transversely disposed push and pull transfer mechanism connected with the other end of said lever.

In testimony whereof I have hereunto set my hand.

NILS D. LEVIN.